(12) United States Patent
Inoue

(10) Patent No.: US 6,641,241 B2
(45) Date of Patent: Nov. 4, 2003

(54) METHOD OF GENERATING HALFTONE THRESHOLD DATA

(75) Inventor: Yoshiaki Inoue, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/165,978

(22) Filed: Jun. 11, 2002

(65) Prior Publication Data

US 2002/0196310 A1 Dec. 26, 2002

(30) Foreign Application Priority Data

Jun. 12, 2001 (JP) ........................................ 2001-177420

(51) Int. Cl.$^7$ ............................. B41J 2/205; H04N 1/46
(52) U.S. Cl. ......................... 347/15; 358/534; 358/533
(58) Field of Search ........................ 347/15, 43; 358/1.2, 358/1.9, 518, 534, 533, 536, 454, 456

(56) References Cited

U.S. PATENT DOCUMENTS 4,537,470 A  *  8/1985  Schoppmeyer .............. 359/891
5,422,742 A  *  6/1995  Ostromoukhov et al. ... 358/536

FOREIGN PATENT DOCUMENTS

JP          2578947          11/1996

OTHER PUBLICATIONS

"Postscript screening" written by Peter Fink, published by MDN corporation on Aug. 11, 1994, 1$^{st}$ edition.

* cited by examiner

Primary Examiner—Lamson Nguyen
(74) Attorney, Agent, or Firm—Sughrue Mion, PLLC

(57) ABSTRACT

Dot cells are made up of halftone threshold data of color images of C, M, Y, K. At least the dot cells of color images of C, M, K are set under the condition of a non-rational tangent. Halftone screen periods and screen angles of said three color images of C, M, K are set such that a period and an angle of a primary moiré pattern produced when two of the three color images of C, M, K are superposed are substantially equal to a halftone screen period and a screen angle of the remaining one of the three color images of C, M, K. A halftone image is generated using dot cells thus produced.

7 Claims, 13 Drawing Sheets

METHOD OF GENERATING HALFTONE THRESHOLD DATA

BACKGROUND OF THE INVENTION

1. Field of the Invention

The present invention relates to a method of generating halftone threshold data to convert continuous tone image data into binary image data or multi-valued image data for a color halftone image output apparatus in printing applications, such as a color printer, an image setter, a CTP (Computer To Plate) apparatus, a CTC (Computer To Cylinder) apparatus, a DDCP (Direct Digital Color Proof) apparatus, or the like.

2. Description of the Related Art

Halftone image output apparatus record a halftone image on a recording medium such as a printing sheet, a film, or the like by comparing continuous tone image data obtained from an original image with halftone threshold data to generate binary or multi-valued halftone image data, and controlling a laser beam or the like based on the generated binary or multi-valued halftone image data.

FIG. 9 of the accompanying drawings shows the corresponding relationship between a single dot cell 2 made of a plurality of halftone threshold data and pixels 4 formed by a laser beam or the like on a recording medium in a main scanning direction which is indicated by the arrow X and an auxiliary scanning direction which is indicated by the arrow Y. The halftone threshold data are established with respect to the respective pixels 4 in the dot cell 2.

When a plurality of halftone images are superposed to generate a halftone image, a moiré pattern in the halftone image is reduced if each dot cell 2 is established obliquely at a certain angle θ (screen angle θ) to the main scanning direction X or the auxiliary scanning direction Y. The number of tones or gradations of the halftone image is normally determined by the number of pixels 4 which make up each dot cell 2. The output resolution (dpi) of a halftone image output apparatus is defined as the number of pixels 4 per inch, and the screen ruling (halftone screen period) (lpi) is defined as the number of dot cells 2 per inch.

FIG. 10 of the accompanying drawings shows, by way of example, a halftone image generated using the halftone threshold data of the dot cell 2 shown in FIG. 9. The halftone image output apparatus compares the magnitude of continuous tone image data with the magnitude of the halftone threshold data established with respect to the respective pixels 4 in the dot cell 2, thus generating binary image data. Halftone dots 6, shown hatched, represent image areas where the pixels 4 are blackened by a laser beam, for example, based on the generated binary image data.

In order to generate a color halftone image using a halftone image output apparatus, it is necessary to generate halftone images in different colors C, M, Y, K, for example, and superpose the generated halftone images in those colors. When the halftone images are superposed, the generation of a moiré pattern due to the halftone screen period of the dot cells 2 in the halftone image in each color should be avoided. The halftone screen period of the dot cells 2 occurs in a direction along corners a1, a2 of each dot cell 2 and a direction, perpendicular thereto, along corners a1, a4 of each dot cell 2. The pitch of the moiré pattern is smaller as the angles between the directions of the halftone screen period of the dot cells 2 in the superposed halftone images in the different colors differ more widely from each other. The screen angles θ of the colors are established such that the difference between the screen angles θ of the colors C, M, K, which are loud colors, is a maximum, i.e., 30°. Traditionally, the screen angles θ of the colors C, M, K are set to 15°, 45°, and 75°, respectively, and the screen angle θ of the color Y is set to 0°. Since the color Y is a visually less intensive color, the difference between its screen angle and the screen angles of the other colors is set to 15°.

FIG. 11 of the accompanying drawings shows vectors representing the halftone screen periods of the colors and the period of a moiré pattern generated thereby. The magnitudes of the vectors are proportional to the screen ruling (halftone screen period). A vector D1 representing a color image having a screen angle θ1 and a halftone screen period d1 and a vector D2 representing a color image having a screen angle θ2 and a halftone screen period d2 make up a vector D12 representing the direction and period of a primary moiré pattern generated by direct interference between the two halftone screen periods. The vector D12 of the primary moiré pattern has components represented by (d2·cos θ2−d1 cos θ1, d2·sin θ2−d1·sin θ1).

As described above, a color halftone image is formed by three or more superposed images in different colors. If the color images are represented by respective vectors D1, D2, D3 having respective screen angles θ1, θ2, θ3 (θ1<θ3<θ2, see FIG. 11) and respective halftone screen periods d1, d2, d3, then since general color images are periodic at equal pitches in two perpendicular directions, the vectors D1, D2, D3 are associated with respective vectors D1⊥, D2⊥, D3⊥ which are perpendicular to the vectors D1, D2, D3 and have halftone screen periods equal to those of the vectors D1, D2, D3. When the three color images are superposed according to the relationship shown in FIG. 11, then because the vector D12 representing a primary moiré pattern due to the interference between the vectors D1, D2 and the vector D3⊥ have similar magnitudes and angles, a secondary moiré pattern that can easily be recognized by human vision is generated if the two vectors D12, D3⊥ deviate slightly from each other.

In order to eliminate such a secondary moiré pattern, the vector D12 may be equalized to the vector D3⊥. Specifically, if the following conditions are satisfied:

$$d3 \cdot \cos \theta3 = d1 \cdot \cos \theta1 - d2 \cdot \cos \theta2 \qquad (1)$$

$$d3 \cdot \sin \theta3 = d2 \cdot \sin \theta2 - d1 \cdot \sin \theta1 \qquad (2)$$

then the period of the secondary moiré pattern becomes infinitely large, making the secondary moiré pattern invisible to human vision. More specifically, when the screen angle θ of the color image of M is set to 45°, the period of the primary moiré pattern generated by the color images of C, K whose screen angles θ are set to 15° and 75°, respectively, and the halftone screen period of the color image of M whose screen angle θ is set to 45° are equalized to each other, avoiding the generation of a secondary moiré pattern (see Japanese Patent Publication No. 2578947 for details).

In order to satisfy the conditions according to the above equations (1), (2), it is necessary to set the screen angles θ1 through θ3 and the halftone screen periods d1 through d3 of the respective colors to appropriate values.

According to a process of digitally generating the halftone threshold data that make up the dot cell 2 shown in FIG. 9, the halftone threshold data are generated according to the condition of a rational tangent. The condition of a rational tangent is a condition in which when a corner a1 of the square dot cell 2 is placed on a grid of pixels 4, other corners a2 through a4 of the dot cell 2 are also placed on the grid of pixels 4. With respect to the dot cell 2 having the screen angle θ, there are established integers m, n which are mutually prime, as represented by the following equation (3):

$$\theta = \tan^{-1}(n/m) \quad (3)$$

If the dot cell 2 has a pitch P, which represents the distance between the corners a1, a2 with pixels 4 serving as a unit, then the coordinates of the corners a1 through a4 in the main scanning direction X and the auxiliary scanning direction Y are established as shown in FIG. 9 using the corner a1 as the origin.

In order for the dot cell 2 having the screen angle θ and the pitch P to satisfy the condition of a rational tangent, the coordinates of the corners a1 through a4 should be expressed by integral values. If A, B represent integers, then it is a necessary and sufficient condition to satisfy the following equations:

$$P \cdot \cos\theta = A \quad (4)$$

$$P \cdot \sin\theta = B \quad (5)$$

From the equations (4), (5), the following equation (6) is obtained:

$$\tan\theta = B/A \quad (6)$$

If k1 is an integer other than 0, then the following relationships are obtained from the equation (6):

$$A = k1 \cdot m \quad (7)$$

$$B = k1 \cdot n \quad (8)$$

Putting the equation (7) into the equation (4), the following equation (9) is obtained:

$$P = A/\cos\theta \quad (9)$$
$$= k1 \cdot \sqrt{(m^2 + n^2)}$$

The equation (9) generally represents the condition in which the dot cell 2 having the screen angle θ and the pitch P satisfies a rational tangent, with parameters m, n representing the screen angle θ of the dot cell 2 expressed by the equation (3) and the pitch P of the dot cell 2. The screen ruling (halftone screen period) is indicated by the reciprocal of P·q where q represents the size of each pixel 4. Therefore, with respect to the color images whose screen angles θ are 0° and 45°, dot cells 2 capable of establishing an accurate screen angle θ can be determined with respect to a number of screen rulings according to the relationship of the equations (3), (9).

However, with respect to the color images whose screen angles θ are 15° and 75°, dot cells 2 having screen angles close to 15° and 75° can only be determined with respect to a limited number of screen rulings. Therefore, the degree of freedom of dot cells 2 that can be selected is low.

According to another process shown in FIG. 12 of the accompanying drawings, a supercell 9 is made up of dot cells 8, and a screen angle θ and a screen ruling are established to satisfy the condition of a rational tangent in which the supercell 9 has corners B1 through B4 placed on the grid of pixels 4. For details of the generation of a halftone image in relation to the supercell 9, reference should be made to, for example, a book entitled "Postscript screening" written by Peter Fink, published by MDN corporation on Aug. 11, 1994, 1st edition, 1st printing.

The condition of a rational tangent shown in FIG. 12 will be considered below. First, parameters m, n capable of expressing the screen angle θ of the supercell 9 according to the equation (3) are established. It is assumed that the number of dot cells 8 making up the supercell 9 is represented by $\alpha^2$ and k2 represents an integer other than 0. The coordinates of the corner B2 are set to (k2·m, k2·n). In FIG. 12, since cos θ is expressed using the parameters m, n and using the pitch P as follows:

$$\cos\theta = m/\sqrt{(m^2+n^2)} = k2 \cdot m/(P \cdot \alpha) \quad (10)$$

the relationship between the pitch P of the dot cells 8 and the parameters m, n, α at the time the supercell 9 whose screen angle θ is expressed by the equation (3) satisfies the condition of a rational tangent is represented by:

$$P = k2/\alpha \cdot \sqrt{(m^2+n^2)} \quad (11)$$

By constructing the supercell 9 of a number of dot cells 8 which satisfy the equation (11), it is possible to make the screen angle θ as close to 15° and 75° as possible, and the degree of freedom for selecting screen rulings is increased.

When the supercell 9 and dot cells 2 individually satisfying the condition of a rational tangent are combined with each other, color images are generated using the supercell 9 at 15° and 75°, and color mages are generated using dot cells 2 according to a rational tangent at 0° and 45°, the screen angles θ and the pitch P are established highly accurately, and a halftone image with the possibility of a moiré pattern being highly reduced can be generated.

Recently, it has become possible to establish output conditions of a low output resolution and many screen rulings, using the supercell 9, to output a highly defined halftone image of high gradations. Since the output resolution is low, the number of gradations which can be expressed by one dot cell 8 is small. However, an image of many gradations can be expressed by clustering a plurality of dot cells 8 and optimizing the layout of halftone threshold data thereof. According to this process, an image which has heretofore been outputted at an output resolution of 2400 dpi (dots per inch) and a screen ruling of 175 lpi (lines per inch) can be outputted at an output resolution of 1200 dpi and a screen ruling of 175 lpi with an equivalent or higher image quality. As a result, a halftone image can be outputted at a high speed.

If a halftone image output apparatus having output conditions of a low output resolution and many screen rulings uses dot cells 2 satisfying the condition of a rational tangent for color images whose screen angles θ are 0° and 45°, then since the shapes of halftone dots 6 shown in FIG. 10 are identical with respect to the same halftone area percentage, the halftone dots 6 are simultaneously held in contact with each other in the vicinity of a halftone area percentage of 50%, in particular, in the range of gradations where the halftone area percentage is gradually higher. Consequently, the halftone image tends to suffer a tone jump. This tendency is greater as the output resolution is lower.

SUMMARY OF THE INVENTION

It is a general object of the present invention to provide a method of generating halftone threshold data to avoid the occurrence of a tone jump and make a moiré pattern less visible in a halftone image output apparatus having output conditions of a low output resolution and many screen rulings.

Another object of the present invention to provide a method of generating halftone threshold data to keep a sufficient number of gradations in a halftone image output apparatus having output conditions of a low output resolution and many screen rulings.

Still another object of the present invention to provide a method of generating halftone threshold data to reduce a moiré pattern produced due to an interference between superposed color images in a halftone image output apparatus having output conditions of a low output resolution and many screen rulings.

Yet still another object of the present invention to provide a method of generating halftone threshold data to make the screen angle of each color image close to a desired angle and also to make the screen ruling close to a desired screen ruling in a halftone image output apparatus having output conditions of a low output resolution and many screen rulings.

According to the present invention, there is provided a method of generating halftone threshold data for color images of C, M, Y, K to reproduce a color image, comprising the steps of setting dot cells made up of the halftone threshold data under output conditions including an output resolution of 2000 dpi or less and an output resolution/halftone screen period ratio to 8 dpi/lpi or less, setting the dot cells of at least the three color images of C, M, K under the condition of a non-rational tangent, and setting halftone screen periods and screen angles of the three color images of C, M, K such that a period and an angle of a primary moiré pattern produced when two of the three color images of C, M, K are superposed are substantially equal to a halftone screen period and a screen angle of the remaining one of the three color images of C, M, K.

Since the layout of the halftone threshold data differs from dot cell to dot cell, a tone jump is not visually recognized when halftone images having the same halftone area percentage are formed. This advantage is obtained especially for dot cells that are set under output conditions including an output resolution of 2000 dpi or less and an output resolution/halftone screen period ratio to 8 dpi/lpi or less.

The above and other objects, features, and advantages of the present invention will become more apparent from the following description when taken in conjunction with the accompanying drawings in which preferred embodiments of the present invention is shown by way of illustrative example.

DESCRIPTION OF THE PREFERRED EMBODIMENTS

Figure 1:
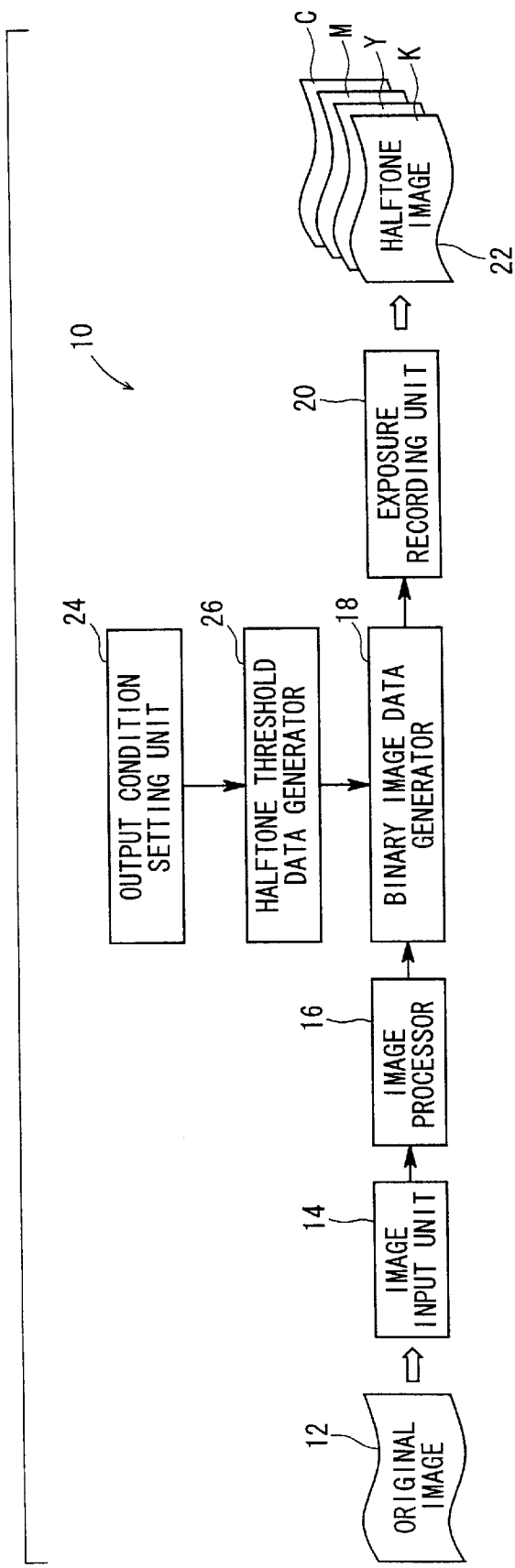
FIG. 1 is a block diagram of a halftone image output apparatus according to the present invention.

FIG. 1 shows in block form a halftone image output apparatus 10 according to the present invention. As shown in FIG. 1, the halftone image output apparatus 10 has an image input unit 14 for reading an original image 12 and generating continuous tone image data from the read original image 12, an image processor 16 for processing the continuous tone image data from the image input unit 14, a binary image data generator 18 for converting the processed continuous tone image data into binary image data using halftone threshold data, and an exposure recording unit 20 for controlling a laser beam or the like based on the binary image data from the binary image data generator 18 to record halftone images 22 in the colors C, M, Y, K on a recording medium such as a film or the like. The halftone images 22 in the colors C, M, Y, K are superposed to produce a color halftone image on the recording medium.

The halftone image output apparatus 10 also has an output condition setting unit 24 for setting output conditions including screen angles and screen rulings (halftone screen periods) of supercells for forming the halftone images 22 and an output resolution of the halftone image output apparatus 10, and a halftone threshold data generator 26 for generating halftone threshold data to produce supercells according to the output conditions set by the output condition setting unit 24. The binary image data generator 18 generates binary image data by comparing the magnitude of continuous tone image data supplied from the image processor 16 with the magnitude of halftone threshold data supplied from the halftone threshold data generator 26.

The halftone image output apparatus 10 is basically constructed as described above. Operation and advantages of the halftone image output apparatus 10 will be described below.

The halftone image output apparatus 10 has an output resolution set to 2000 dpi or less and an output resolution/halftone screen period ratio to 8 dpi/lpi or less. For example, the output resolution is set to 1200 dpi and the screen ruling is set to 175 lpi. With the output conditions of the halftone image output apparatus 10 being thus set, the halftone image output apparatus 10 is capable of outputting halftone images whose tone jumps are not visible and hence whose coarse gradations are not visible to the human eye.

The screen angles $\theta_1$, $\theta_2$, $\theta_3$ of dot cells 8 for producing color images of C, M, K and the screen rulings (halftone screen periods) d1, d2, d3 are set so as to satisfy the equations (1) and (2). The screen angle of a dot cell 8 for producing a color image of Y can be set to an angle which is substantially intermediate between the screen angles of any desired two color images. For example, the screen angle of the dot cell 8 for producing a color image of Y is angularly displaced 15° from the screen angle of the dot cell 8 for producing a color image of C.

The color images of C, M, Y, K are formed based on supercells 9, and the dot cells 8 making up each of the supercells 9 are set under a condition where the condition of a rational tangent is not satisfied (hereinafter referred to as "the condition of a non-rational tangent). Since the color Y is a visually less intensive color, it may not necessarily be set under the condition of a non-rational tangent.

The condition of a non-rational tangent in the case where the supercell 9 shown in FIG. 12 will be considered below. The dot cells 9 that make up the supercell 9 have a pitch P expressed by the equation (11). In the equation (11), $\alpha^2$ represents the number of dot cells 8 that make up the supercell 9, k2 an integer other than 0, and m, n parameters representing the screen angle θ according to the equation (3).

The condition in which the dot cells 8 are subject to a rational tangent is generally expressed by the equation (9). From the equations (9), (11), the condition in which the dot cells 8 and the supercell 9 shown in FIG. 12 are subject to a rational tangent is expressed by:

$$k2 = \alpha \cdot k1 \tag{12}$$

The condition in which the dot cells 8 are subject to a non-rational tangent is given as follows:

$$k2 \neq \alpha \cdot k1 \tag{13}$$

Figure 12:
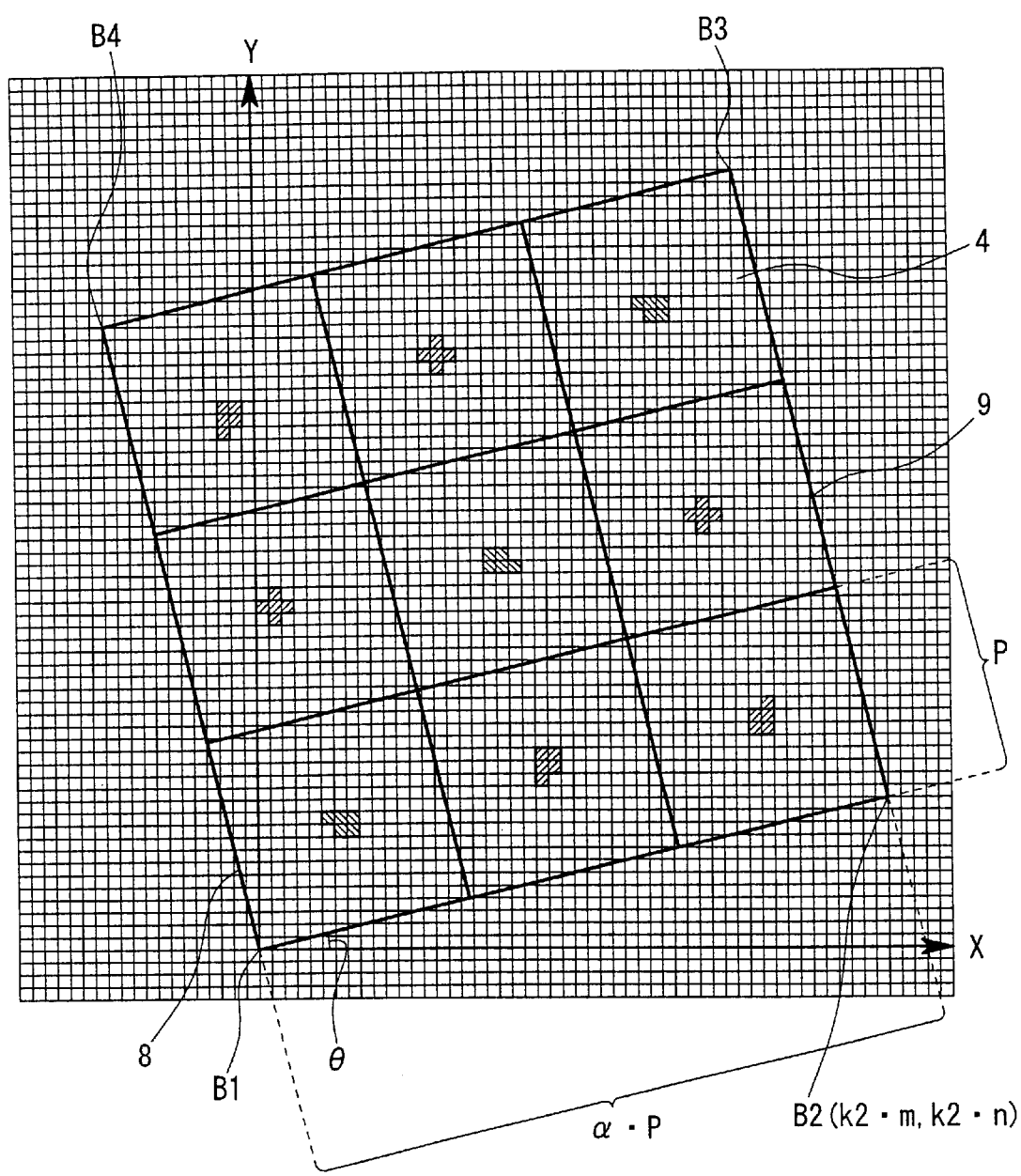
FIG. 12 is a diagram showing a supercell.
Figure 13:
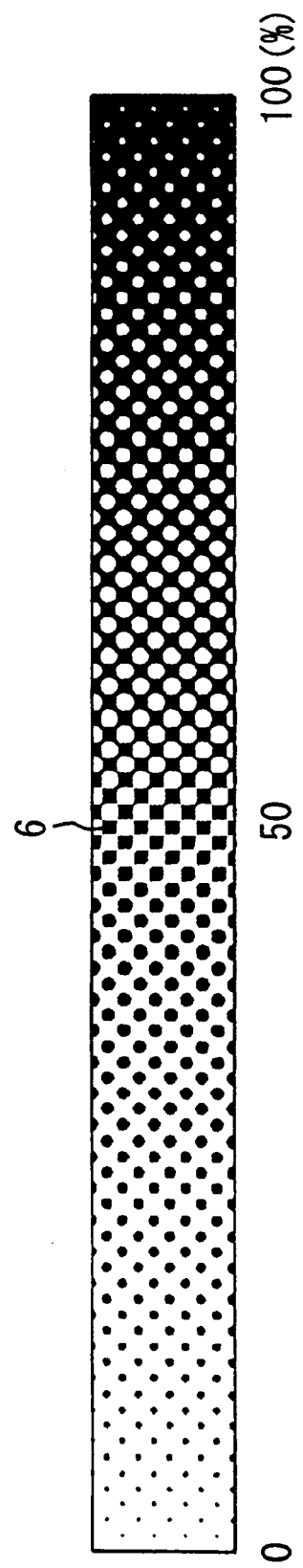
FIG. 13 is a diagram showing a halftone image generated based on halftone threshold data according to the condition of a rational tangent.

From the equation (13), the condition in which the dot cells 8 in the supercell 9 shown in FIG. 12 are not subject to a rational tangent is to determine the pitch P of the dot cells 8 according to the equation (11) so that k2 is not an integral multiple of α when the screen angle θ is set since k1 is an integer other than 0.

Figure 2:
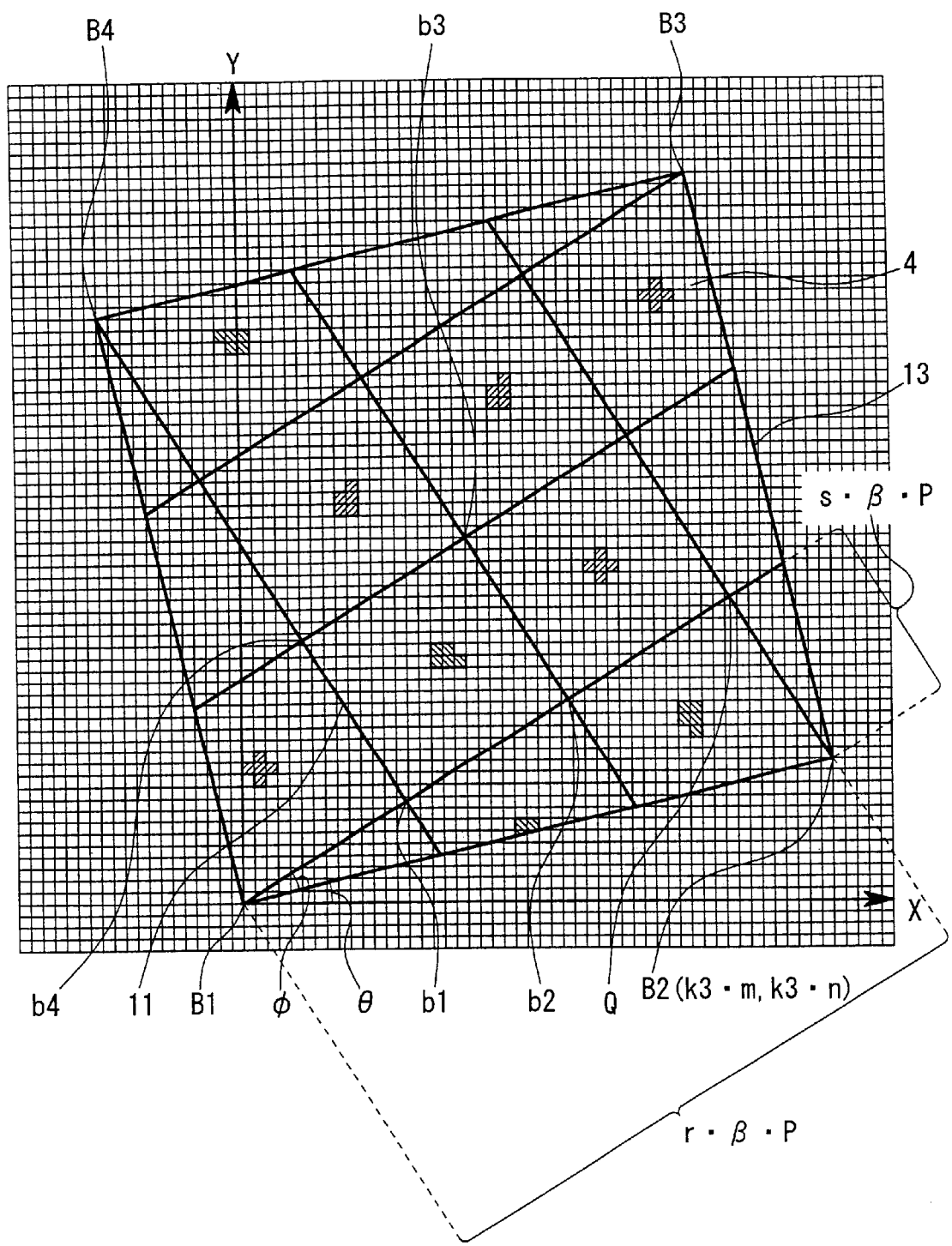
FIG. 2 is a diagram showing a supercell established in a method of generating halftone threshold data according to the present invention.

FIG. 2 shows a supercell 13 set to the angle θ which is made up of dot cells 11 having a screen angle (θ+φ). The supercell 13 is a generalized version of the supercell 9 shown in FIG. 12. The condition in which the dot cells 11 making up the supercell 13 are subject to a non-rational tangent is determined.

First, the relationship between the parameters and the pitch P of the dot cells 11 is determined. If the dot cells 11 satisfy the condition of a rational tangent, then dot cells 11 inclined by an angle φ expressed by the relationship:

$$\phi = \tan^{-1}(s/r) \tag{14}$$

where r, s are integers which are mutually prime, are set in the supercell 13 which is inclined by the angle θ expressed by the equation (3) using the integers m, n which are mutually prime.

At this time, r·β dot cells 11 where β represents an integer are present on a line segment B1Q, and s·β dot cells 11 are present on a line segment B2Q. If the supercell 13 satisfies the condition of a rational tangent, then since a corner B2 of the supercell 13 has to be set on a grid of pixels 4, the coordinates of the corner B2 may be set to (k3·m, k3·n) where k3 is an integer other than 0, with a corner B1 having coordinates (0, 0). In FIG. 2, cos φ is defined by:

$$\cos \phi = r \cdot \beta \cdot P / (k3 \cdot \sqrt{(m^2 + n^2)}) \tag{15}$$

From the equations (14), (15), the pitch P of the dot cells 11 is determined as:

$$P = k3/\beta \cdot \sqrt{(m^2 + n^2)} / \sqrt{(r^2 + s^2)} \tag{16}$$

and can be expressed by the parameters m, n, r, s, k3, β of the dot cells 11.

If the dot cells 11 satisfy the condition of a rational tangent, then the condition in which corners b1 through b4 of the dot cells 11 having the pitch P are present on the grid of pixels 4 is to satisfy the following equations:

$$P \cdot \cos (\theta + \phi) = C \tag{17}$$

$$P \cdot \sin (\theta + \phi) = D \tag{18}$$

where C, D represent integers.

From the equations (3), (14) and according to the addition theorem of trigonometry, the following relationship is obtained:

$$\tan (\theta + \phi) = (m \cdot s + n \cdot r)/(m \cdot r - n \cdot s) \tag{19}$$

From the equations (17), (18), and (19), the following relationships are obtained:

$$C = k4 \cdot (m \cdot r - n \cdot s) \tag{20}$$

$$D = k4 \cdot (m \cdot s + n \cdot r) \tag{21}$$

where k4 is an integer other than 0. From the equations (17), (19), and (20), the following relationship is obtained:

$$P = k4 \cdot \sqrt{((r^2 + s^2) \cdot (m^2 + n^2))} \tag{22}$$

The equation (22) represents, with the parameters, the pitch P of the dot cells 11 when the supercell 13 is subject to a rational tangent.

By eliminating the pitch P, from the equations (16), (22), the condition in which the dot cells 11 and the supercell 13 are subject to a rational tangent is given as:

$$k3 = \beta \cdot k4 \cdot (r^2 + s^2) \tag{23}$$

Therefore, using the parameters of the supercell 13, the condition in which the dot cells 11 making up the supercell 13 shown in FIG. 2 are subject to a non-rational tangent is given as:

$$k3 \neq \beta \cdot k4 \cdot (r^2 + S^2) \tag{24}$$

The screen angles (θ+φ) of the dot cells 11 which form the color images of C, M, Y, K where the condition of a non-rational tangent according to the equation (24) may be set to 20°, 50°, 5°, 80° or 22.5°, 52.5°, 7.5°, 82.5°, for example, with respect to the color images of C, M, Y, K, respectively.

The operator of the halftone image output apparatus 10 operates the output condition setting unit 24 to set, as the output conditions of the halftone image output apparatus 10, the output resolution to 1200 dpi and the screen ruling (halftone screen period) to 175 lpi, for example. The operator also sets the screen angles (θ+φ) of the dot cells 11 for the color images of C, M, Y, K to 22.5°, 52.5°, 7.5°, 82.5°.

After the output conditions are thus established, the halftone threshold data generator 26 determines parameters of the respective color images based on the output conditions. Specifically, parameter candidates are selected according to the equation (24) so that they are subject to a non-rational tangent for the respective color images and those parameters for the color images C, M, K which satisfy the equations (1), (2) are determined among the selected parameter candidates. Based on the determined parameters, halftone threshold data for the respective color images are generated.

The image input unit 14 reads the original image 12, generates continuous tone image data from the read original image 12, and supplies the generated continuous tone image data to the image processor 16. The image processor 16 processes the supplied continuous tone image data as desired. Thereafter, the image processor 16 compares the magnitude of the continuous tone image data with the magnitude of the halftone threshold data generated by the halftone threshold data generator 26, and generates binary image data. The exposure recording unit 20 turns on and off a laser beam or the like based on the binary image data to record halftone images 22 of the colors C, M, Y, K on a recording medium such as a film or the like. Printing plates of the respective colors are then produced from the recorded halftone images 22 of the colors C, M, Y, K. Superposed images are then generated using the printing plates, thus generating a color halftone image.

The halftone images 22 of the respective colors C, M, Y, K are generated based on the dot cells 11 which are set under the condition of a non-rational tangent. The positions of the pixels 4 with respect to a dot cell 11 which has corners b1 through b4 are usually different from the positions of the pixels 4 in an adjacent dot cell 11. Therefore, when continuous tone image data are converted into binary image data using halftone threshold data set depending on the pixels 4, the halftone tone shapes of the binary image data differ from dot cell 11 to dot cell 11 even if the continuous tone image data are the same.

Figure 3:
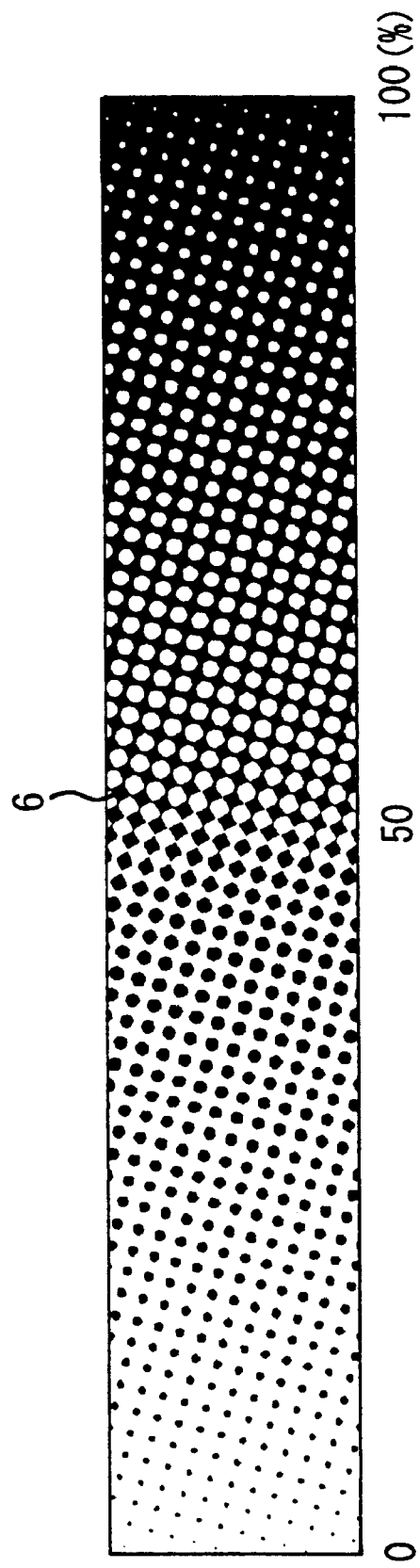
FIG. 3 is a diagram showing a halftone image generated based on halftone threshold data according to the condition of a non-rational tangent which is generated by the method of generating halftone threshold data according to the present invention.
Figure 4:
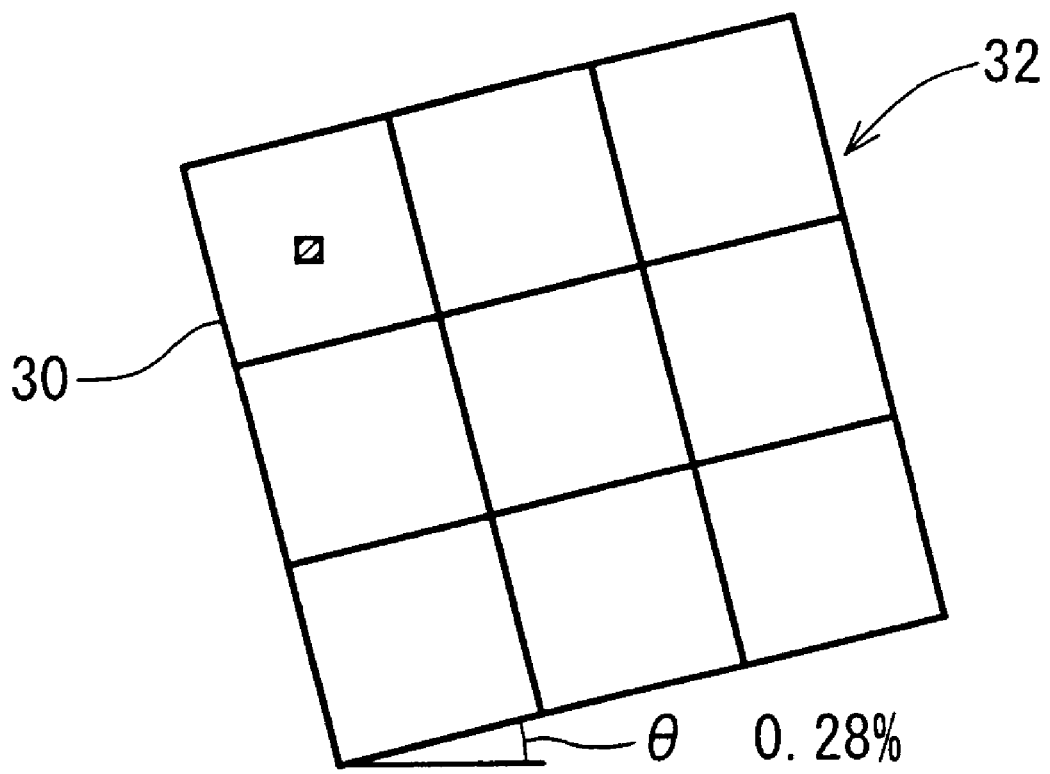
FIG. 4 is a diagram showing a multidot cell generated by the method of generating halftone threshold data according to the present invention.
Figure 5:
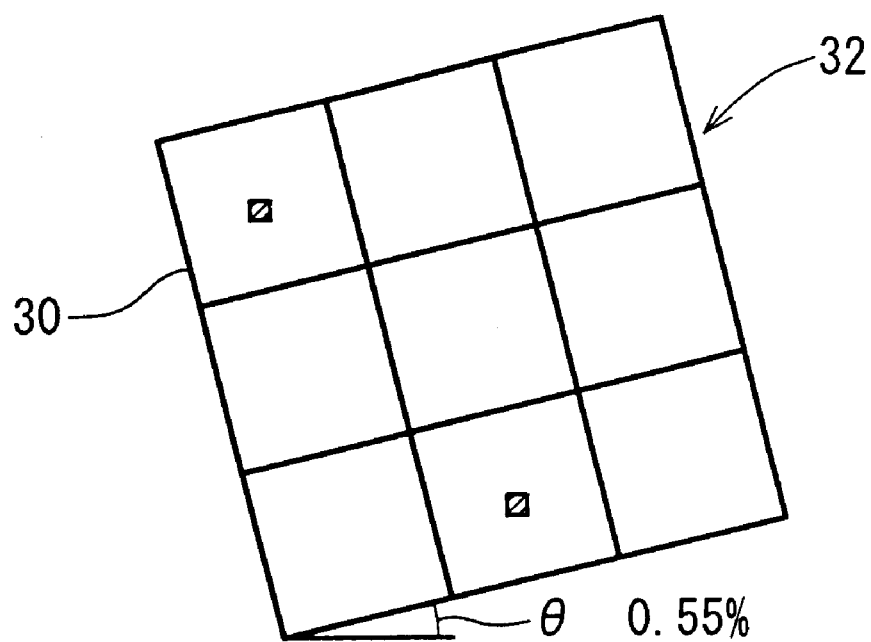
FIG. 5 is a diagram showing a multidot cell generated by the method of generating halftone threshold data according to the present invention.
Figure 6:
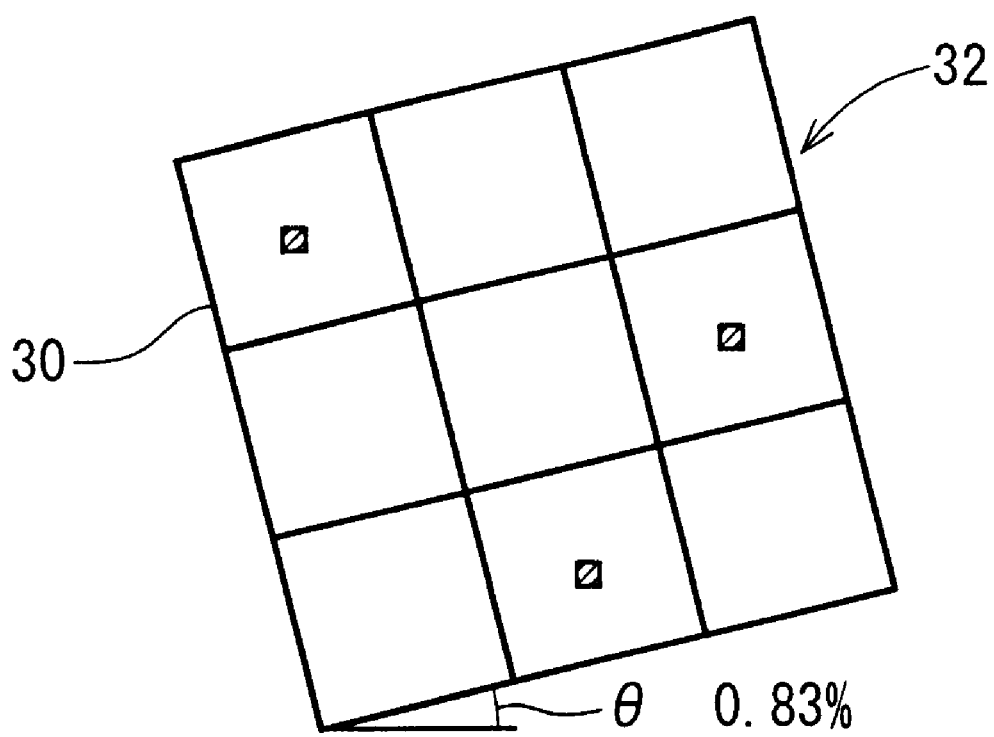
FIG. 6 is a diagram showing a multidot cell generated by the method of generating halftone threshold data according to the present invention.
Figure 7:
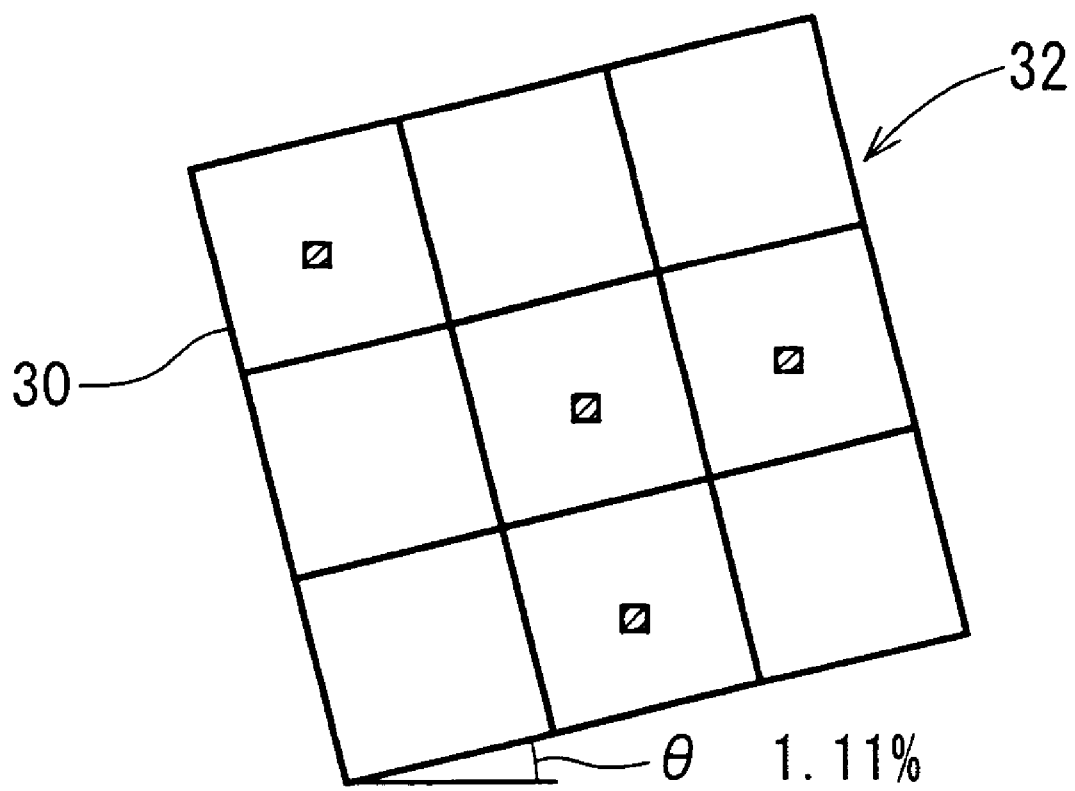
FIG. 7 is a diagram showing a multidot cell generated by the method of generating halftone threshold data according to the present invention.
Figure 8:
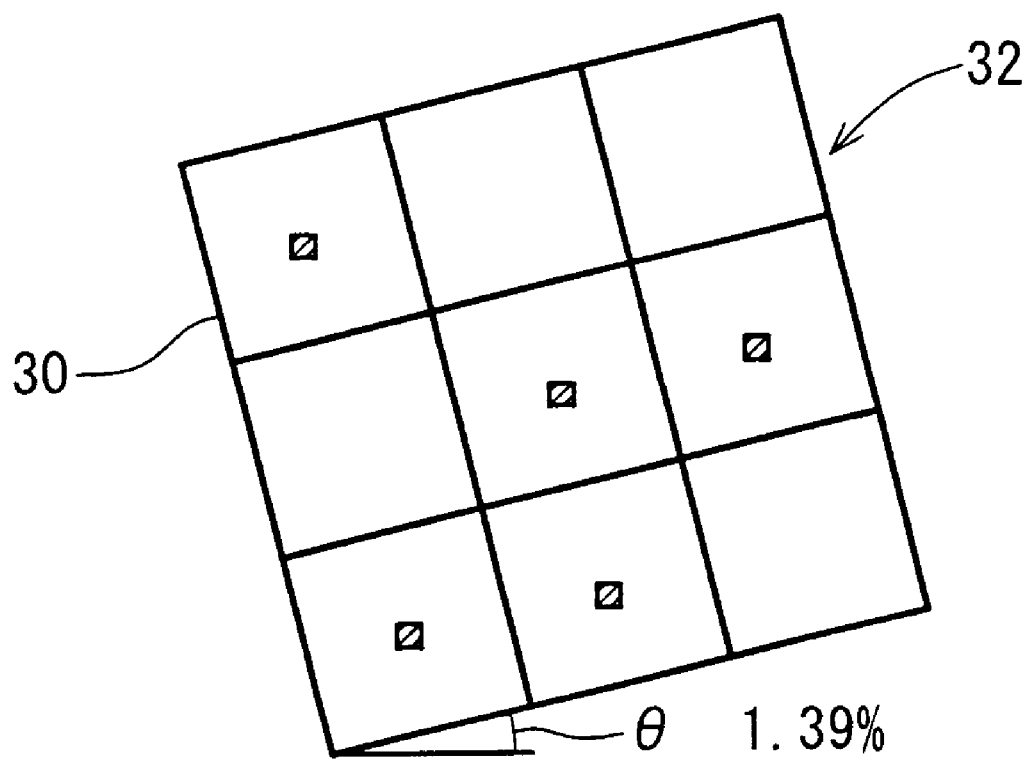
FIG. 8 is a diagram showing a multidot cell generated by the method of generating halftone threshold data according to the present invention.
Figure 9:
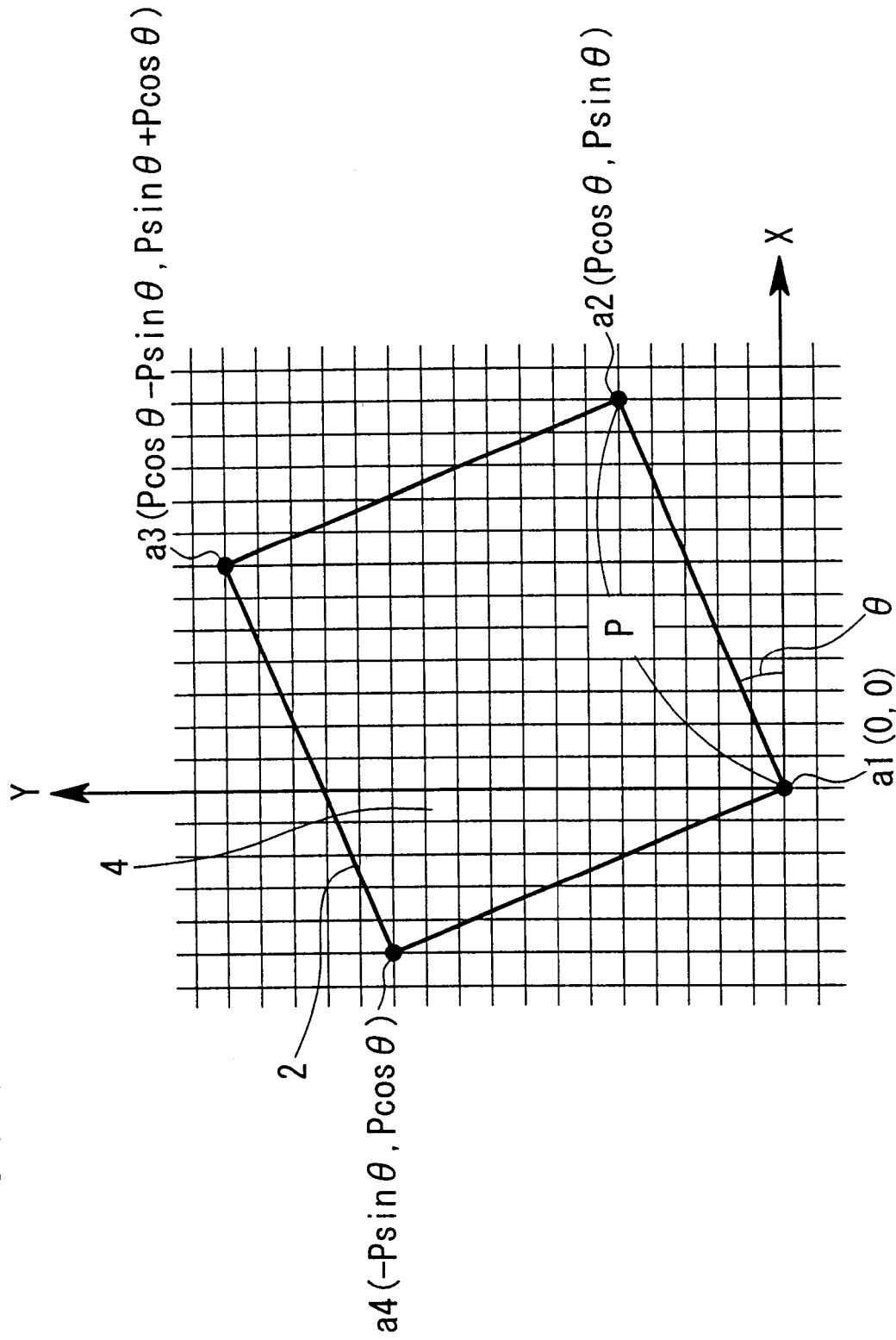
FIG. 9 is a diagram showing a dot cell established according to the condition of a rational tangent.
Figure 10:
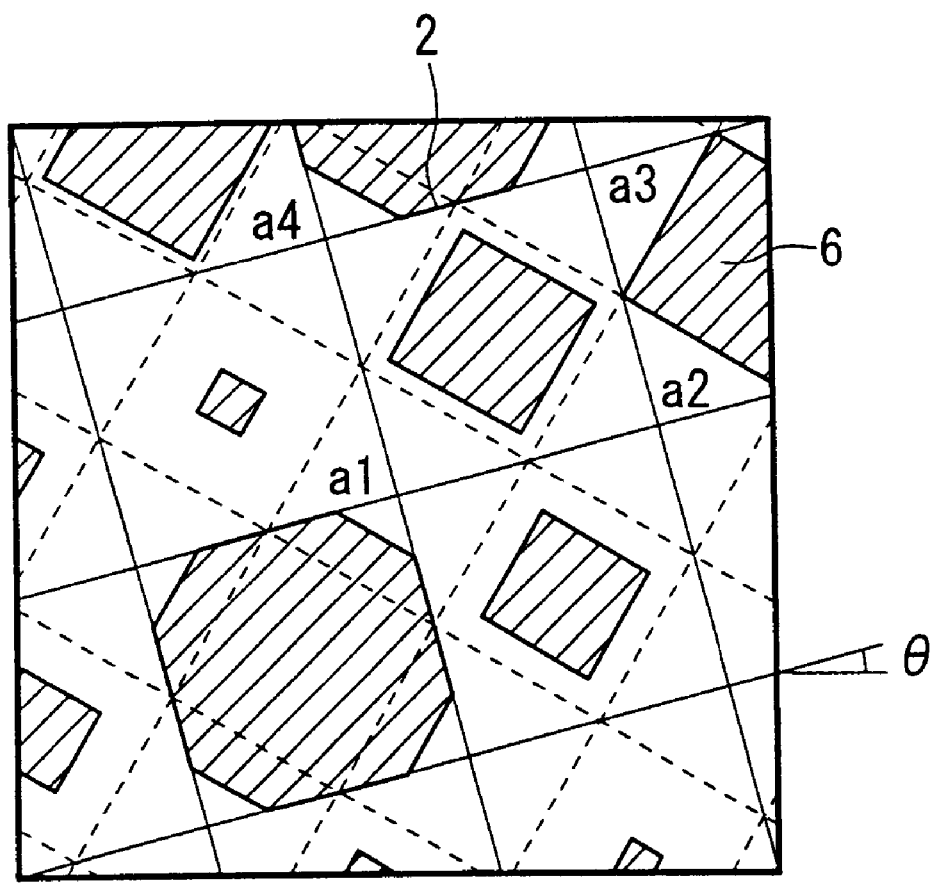
FIG. 10 is a diagram showing a halftone image formed using dot cells established according to the condition of a rational tangent.
Figure 11:
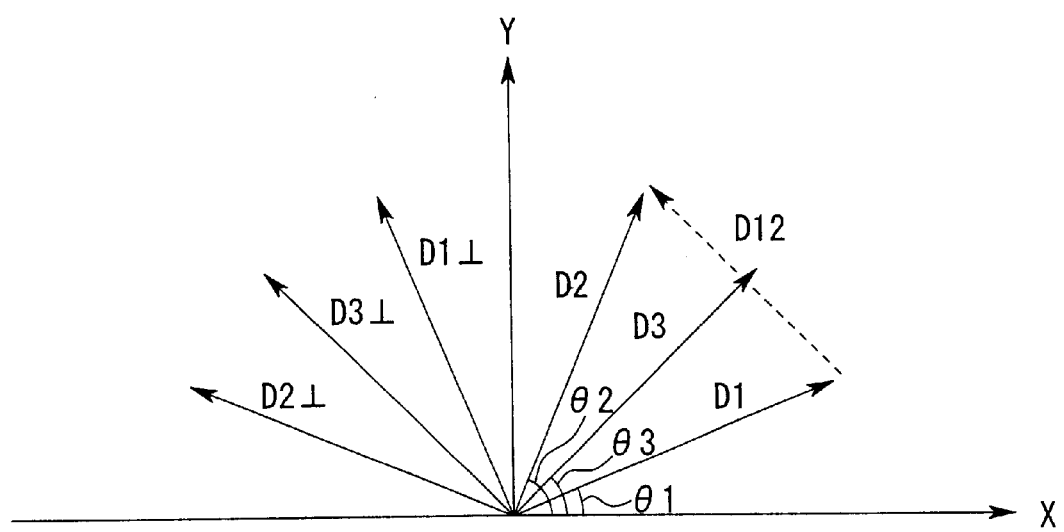
FIG. 11 is a diagram showing vectors representative of the halftone screen periods of respective color images and the period of a moiré pattern produced thereby.

In FIG. 2, halftone images produced from binary image data converted from the same continuous tone image data are shown hatched. Since the halftone images differ in shape from dot cell 11 to dot cell 11, even when the halftone area percentage of the halftone images is progressively increased nearly to 50%, the halftone dots 6 are not simultaneously brought into contact with each other, as shown in FIG. 3. Therefore, the halftone images 22 are free of a tone jump even if the output resolution is low and there are many screen rulings.

Since each of the dot cells 11 is set under the condition of a non-rational tangent, the screen angle $(\theta+\phi)$ thereof can be sufficiently brought near a desired angle, and the screen ruling can be made close to a desired screen ruling. Consequently, the possibility of a moiré pattern caused by an interference between the superposed color images is sufficiently lowered.

In the above embodiment, halftone threshold data are determined by the supercell 13 that is made up of dot cells 11 set under the condition of a non-rational tangent. However, as shown in FIGS. 4 through 8, one multidot cell 32 may be made up of a plurality of dot cells 30 set under the condition of a non-rational tangent for avoiding a tone jump and a moiré pattern.

Specifically, the multidot cell 32 shown in FIGS. 4 through 8 is made up of a plurality of dot cells 30 set to a screen angle $\theta$ and generated under the condition of a non-rational tangent. A multigradation halftone image can be expressed by regarding the multidot cell 32 as one dot cell and setting halftone threshold data.

Usually, the number of gradations that can be expressed by one dot cell 30 is supposed to be "the number of pixels making up the dot cell 30+1". The number of gradations that can be outputted as a halftone image can approximately be calculated as "(output resolution/screen ruling)$^2$+1". For example, if the output resolution is 1200 dpi and the screen ruling (halftone screen period) is 189.7 lpi, then an image of about 41 gradations can be expressed.

The halftone image output apparatus 10 is normally required to be capable of expressing an image of about 256 gradations. To achieve 256 gradations using the dot cell 30 capable of expressing an image of about 41 gradations, the gradations may be expressed using, as a unit, a multidot cell 32 including a plurality of dot cells 30 made up of halftone threshold data having different gradations. The halftone threshold data of the dot cells 30 need to be located with respect to highlight and shadow areas of the halftone image such that low-frequency components of the halftone image will not be visually recognized.

In FIGS. 4 through 8, if one dot cell 30 is made up of 40 pixels, then the multidot cell 32 is capable of outputting 361 gradations, allowing a halftone image of 256 gradations to be expressed with a sufficient margin. If the halftone image is blackened one pixel by one pixel, then the halftone area percentage changes about 0.28% each time.

If the number of gradations that can be expressed by one dot cell 30 is indicated by g+1, then the number of gradations that can be expressed by a multidot cell 32 made up of h dot cells 30 is indicated by g·h+1. Therefore, if the number of gradations that can be expressed by a multidot cell 32 is set by:

$$g \cdot h + 1 > f \cdot i \tag{25}$$

where f represents the number of required gradations and i a margin, then the minimum number h of dot cells 30 capable of achieving the number f of required gradations can be determined.

Theoretically, the dot cells 30 may be established with i=1. Actually, however, since the halftone image output apparatus 10 is expected to cause gradation distortions, it may possibly fail to reproduce f gradations with high fidelity. It is therefore desirable to set the margin i to 2 or more, or 4 at maximum. Inasmuch as the number h of dot cells 30 should preferably be set to a value which does not pose a large load because if the number h of dot cells 30 were too large, the number of halftone threshold data for producing binary image data would be increased, increasing the load on the generation of binary image data.

The supercell and the multidot cell described above are different concepts in general. If halftone threshold data of a plurality of dot cells making up the supercell are set differently from each other, then the supercell is the same as the multidot cell. Specifically, if the layout of halftone threshold data making up a supercell which are set independently for each dot cell is changed according to an array rule determined between dot cells, as shown in FIGS. 4 through 8, then the supercell can be made equal to a multidot cell. Since the number of pixels making up the supercell shown in FIG. 2 is represented by $\beta^2 \cdot (r^2+s^2)$ using the parameters of the supercell 13, if the supercell 13 is considered as a multidot cell, then $(\beta^2 \cdot (r^2+s^2)+1)$ gradations can be achieved.

Although certain preferred embodiments of the present invention have been shown and described in detail, it should be understood that various changes and modifications may be made therein without departing from the scope of the appended claims.

What is claimed is:

1. A method of generating halftone threshold data for color images of C, M, Y, K to reproduce a color image, comprising the steps of:

setting dot cells made up of the halftone threshold data under output conditions including an output resolution of 2000 dpi or less and an output resolution/halftone screen period ratio to 8 dpi/lpi or less;

setting the dot cells of at least the three color images of C, M, K under the condition of a non-rational tangent; and setting halftone screen periods and screen angles of said three color images of C, M, K such that a period and an angle of a primary moiré pattern produced when two of the three color images of C, M, K are superposed are substantially equal to a halftone screen period and a screen angle of the remaining one of the three color images of C, M, K.

2. A method according to claim 1, wherein said halftone threshold data are generated as a supercell made up of said dot cells under the condition of a non-rational tangent, and said supercell has the halftone threshold data located independently for each of said dot cells.

3. A method according to claim 1, wherein said halftone threshold data are generated as a multidot cell made up of said dot cells under the condition of a non-rational tangent, and said multidot cell has the halftone threshold data located according to an array rule determined between said dot cells.

4. A method according to claim 3, wherein the following relationship is satisfied:

$$g \cdot h + 1 > f \cdot i$$

where g+1 represents the number of gradations expressed by said dot cells, h represents the number of dot cells making up said multidot cell, f represents the number of required gradations, and i represents a margin.

5. A method according to claim 1, wherein the condition of a non-rational tangent for the dot cells is represented by:

$$k2 \neq \alpha \cdot k1$$

where $\alpha$ represents the number of-dot cells which satisfy the condition of a rational tangent when clustered together, k1, k2 represent parameters determining said halftone screen period and said screen ruling, and each of said k1, k2 is an integer other than 0.

6. A method according to claim 1, wherein the condition of a non-rational tangent for the dot cells is represented by:

$$k3 \neq \beta \cdot k4 \cdot (r^2 + s^2)$$

where k3, k4, $\beta$, r, s represent parameters determining said halftone screen period and said screen ruling, each of said k3, k4, $\beta$ is an integer other than 0, and said r, s are integers which are mutually prime.

7. A method according to claim 1, wherein the following relationship is satisfied:

$$d3 \cdot \cos \theta3 = d1 \cdot \cos \theta1 - d2 \cdot \cos \theta2$$

$$d3 \cdot \sin \theta3 = d2 \cdot \sin \theta3 - d1 \cdot \sin \theta1$$

where d1, d2, d3 represent the halftone screen periods of said dot cells of the respective three color images of C, M, K and $\theta1$, $\theta2$, $\theta3$ ($\theta1 < \theta3 < \theta2$) represent the screen angles of said dot cells of the respective three color images of C, M, K.

* * * * *